Oct. 23, 1951     A. S. TORRES     2,572,678
COFFEE ROASTING APPARATUS

Filed April 9, 1946     13 Sheets-Sheet 1

Inventor
AUGUST S. TORRES
By Henninger and Pillars
Attorneys

Oct. 23, 1951 A. S. TORRES 2,572,678
COFFEE ROASTING APPARATUS
Filed April 9, 1946 13 Sheets-Sheet 2

Inventor
AUGUST S. TORRES,
By Kenninger and Pillars
Attorneys

Oct. 23, 1951     A. S. TORRES     2,572,678
COFFEE ROASTING APPARATUS

Filed April 9, 1946     13 Sheets-Sheet 3

Inventor
AUGUST S. TORRES,
By Henninger and Pillars
Attorneys

Oct. 23, 1951      A. S. TORRES      2,572,678
COFFEE ROASTING APPARATUS
Filed April 9, 1946      13 Sheets-Sheet 5

Inventor
AUGUST S. TORRES,
By Henninger and Pillars
Attorneys

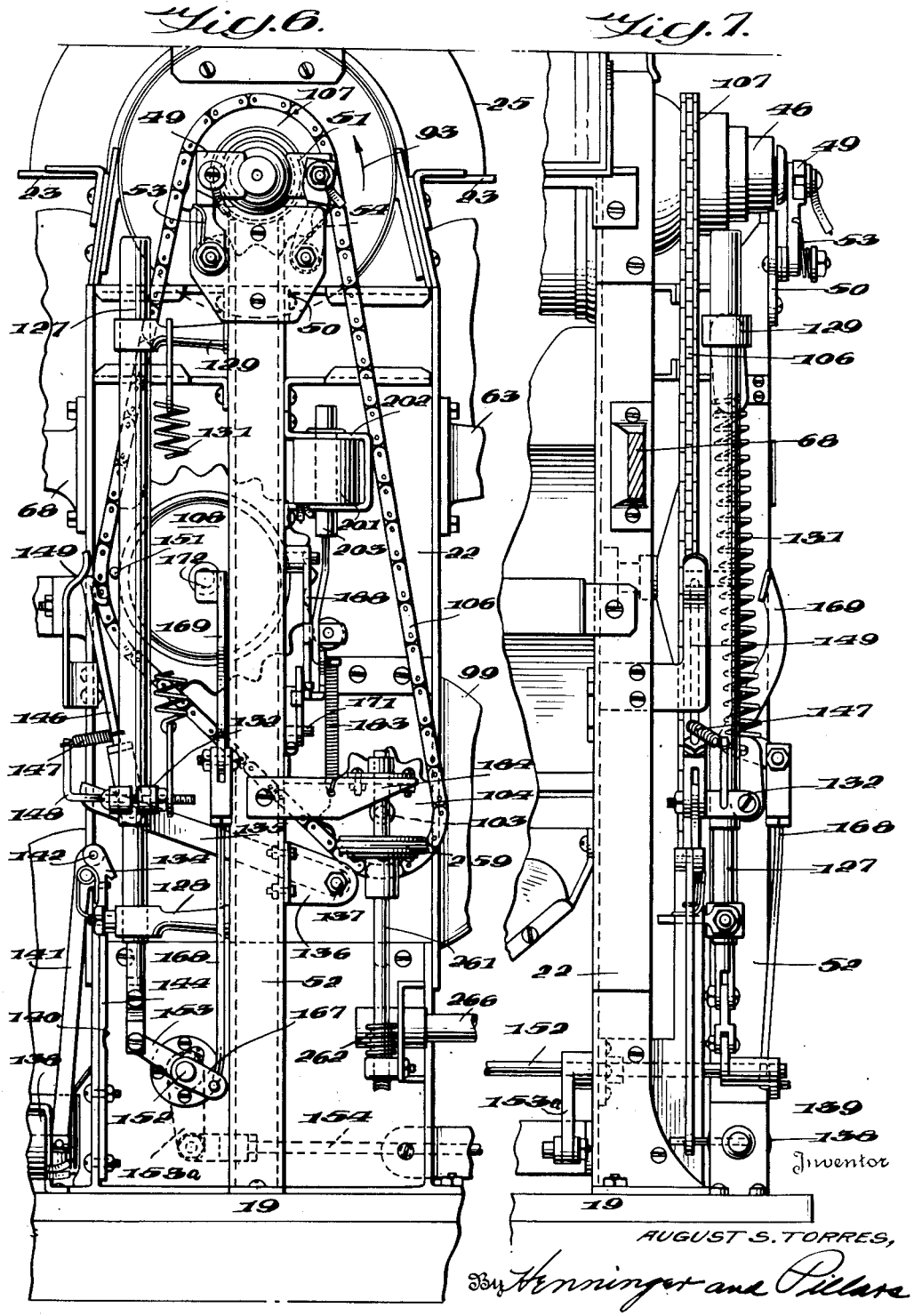

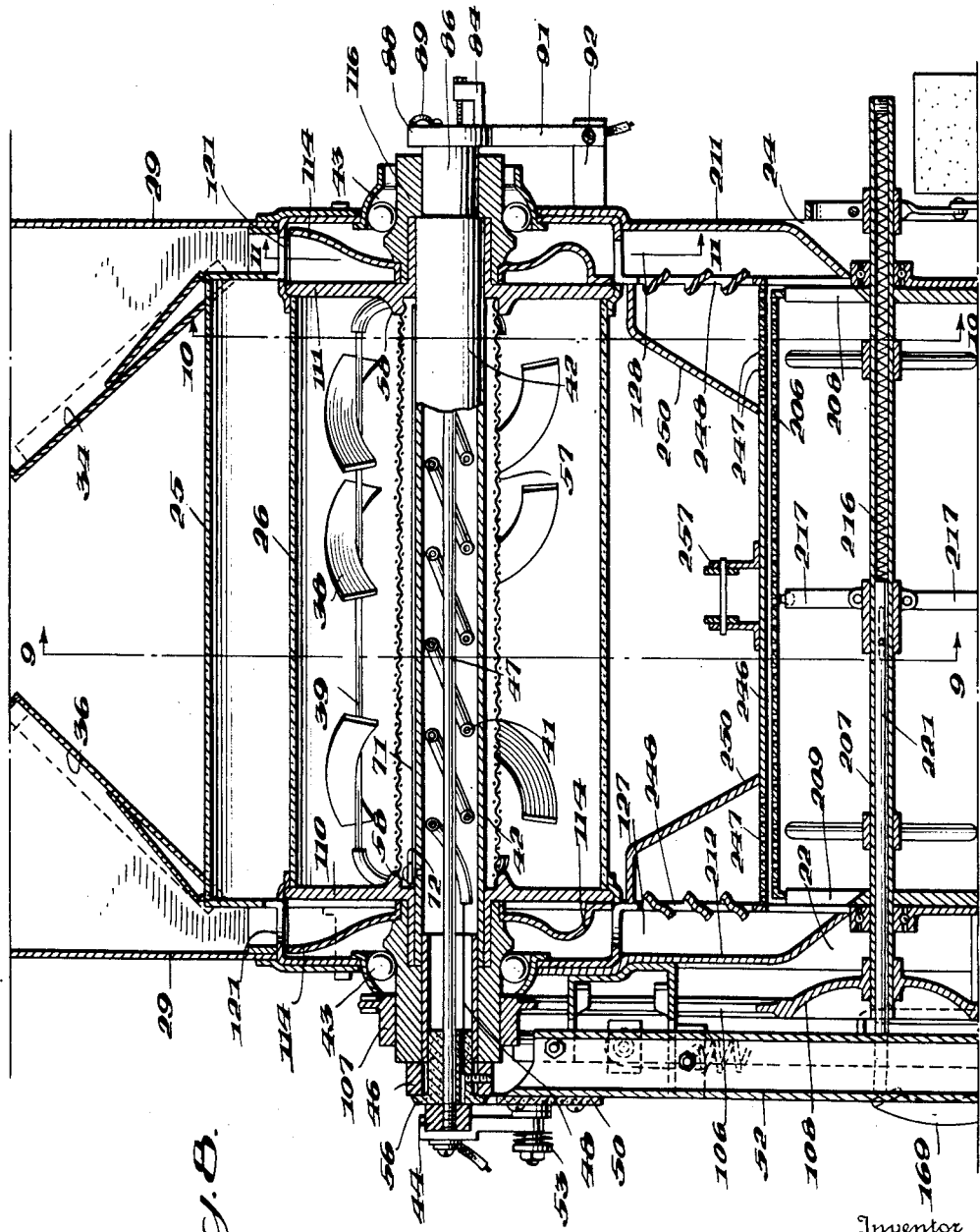

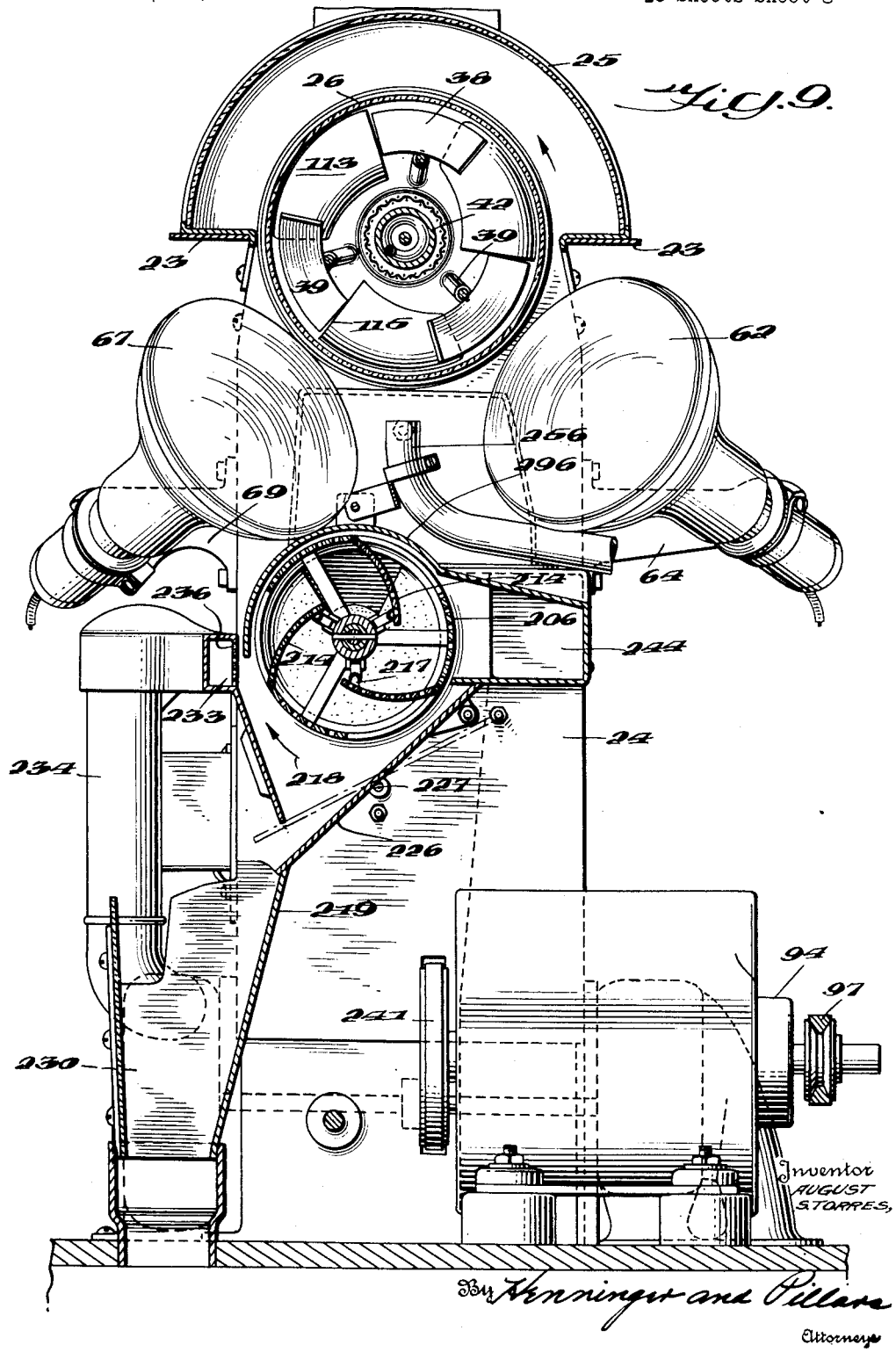

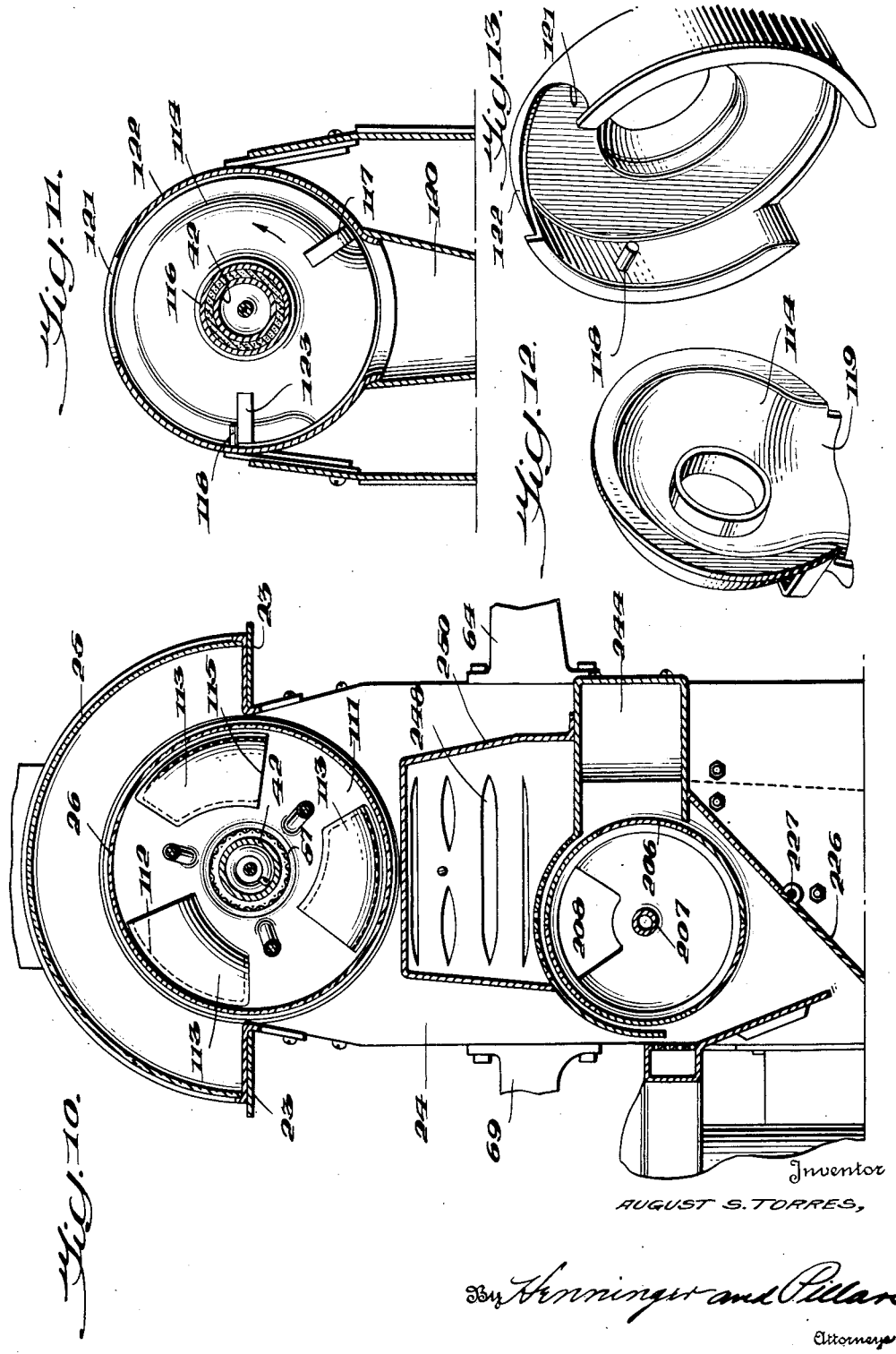

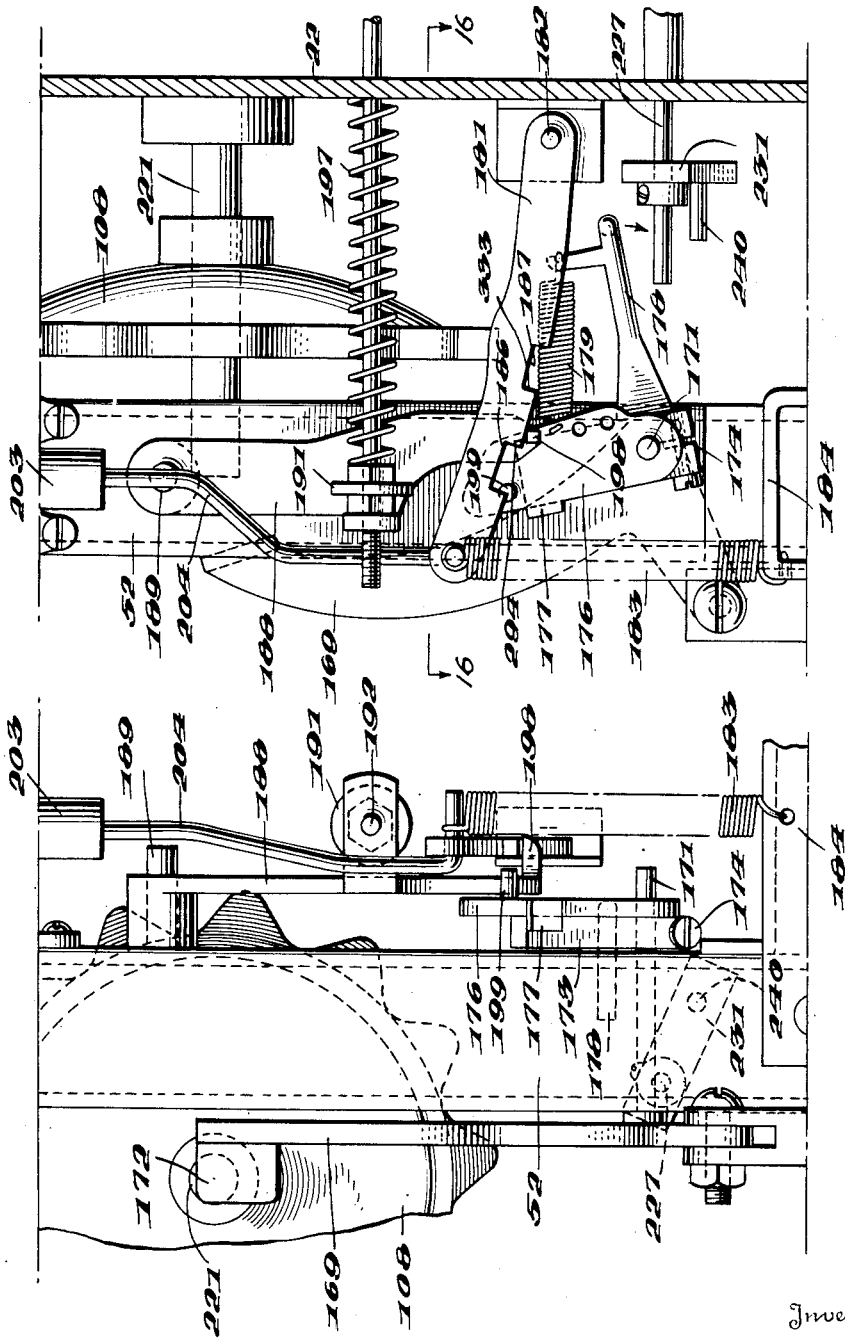

Oct. 23, 1951  A. S. TORRES  2,572,678
COFFEE ROASTING APPARATUS
Filed April 9, 1946  13 Sheets-Sheet 11
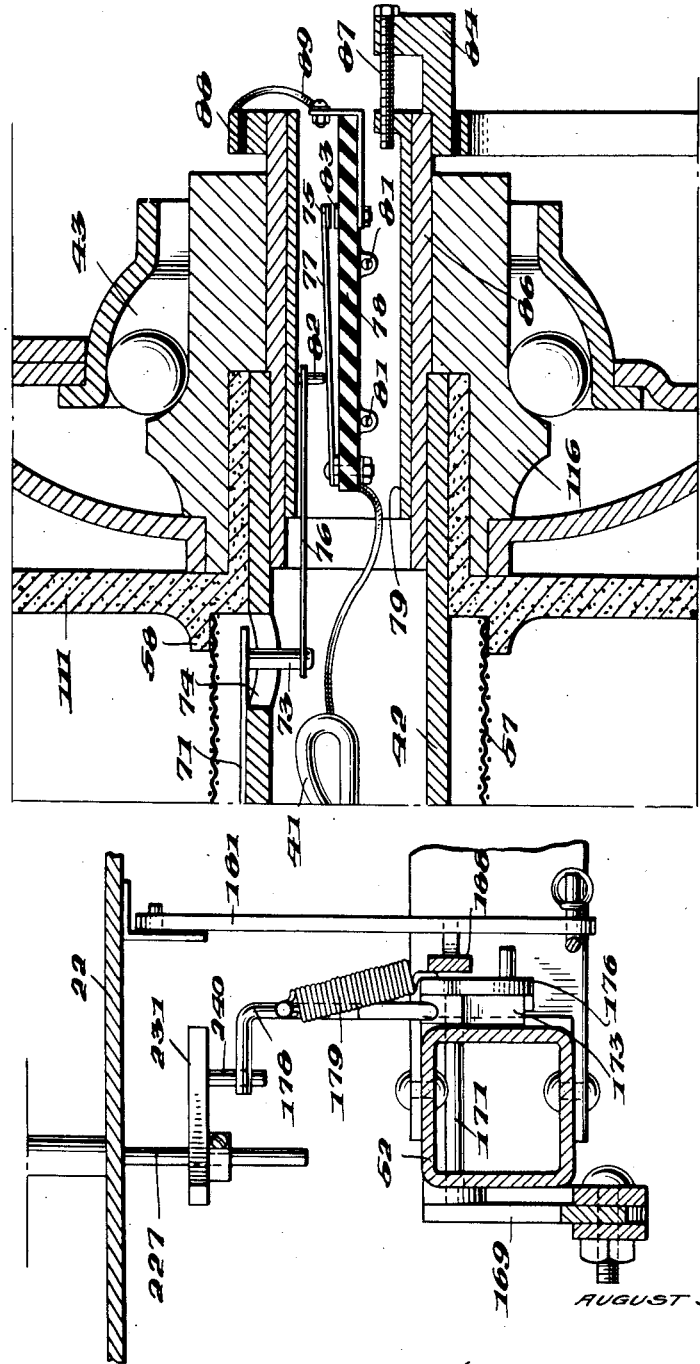

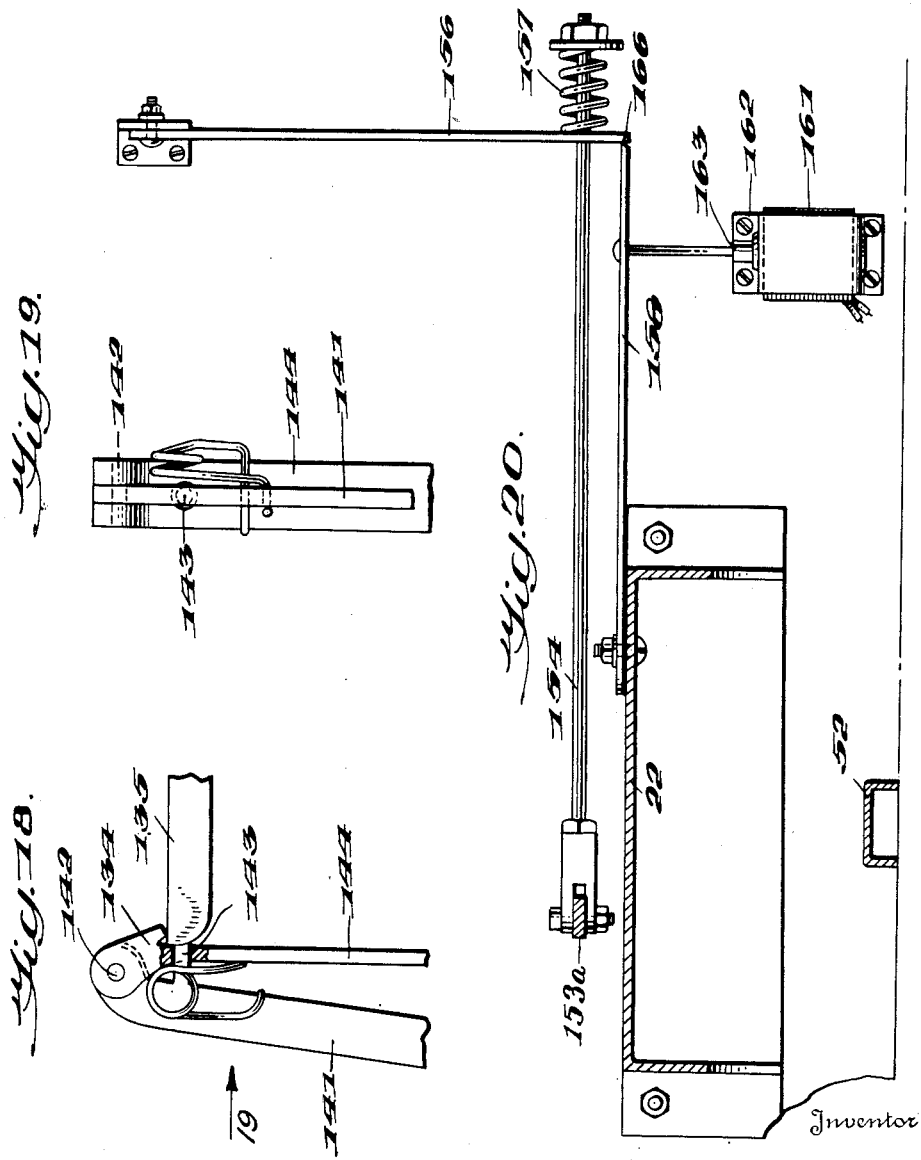

Oct. 23, 1951     A. S. TORRES     2,572,678
COFFEE ROASTING APPARATUS
Filed April 9, 1946     13 Sheets-Sheet 13

Inventor
AUGUST S. TORRES,
By Henninger and Pillare
Attorneys

Patented Oct. 23, 1951

2,572,678

UNITED STATES PATENT OFFICE 2,572,678

COFFEE ROASTING APPARATUS

August S. Torres, Kinderhook, N. Y.

Application April 9, 1946, Serial No. 660,723

5 Claims. (Cl. 34—45)

The present invention relates to apparatus for roasting coffee and more specifically pertains to a machine for automatically roasting coffee beans.

One of the objects of the present invention is to provide a machine wherein a batch of green coffee beans may be automatically introduced into the roasting chamber when the temperature therein has attained a predetermined value and for automatically removing the coffee beans upon the attainment of a predetermined dark color of the beans.

Another object of the invention is to provide apparatus for removing the roasted coffee beans from the roasting drum immediately upon the completion of the roasting period so as to avoid prolonged heating of the coffee beans as a result of the residual heat remaining in the roasting chamber.

Another and further object of the invention pertains to a coffee roasting machine wherein an operation of the machine for the introduction of the coffee beans is delayed until the temperature within the roasting drum has attained a predetermined value.

A more specific object of the invention resides in providing a plurality of sources of heat for the roasting chamber, which are rendered inoperative upon the attainment of a predetermined color for the coffee beans and to provide means for immediately removing the coffee beans from the roasting chamber into a cooling drum wherein a dry quenching of the heated beans is automatically initiated.

Other objects and features of the invention will be more apparent as the present disclosure proceeds and upon consideration of the accompanying drawings and the following detailed description wherein an exemplary embodiment of the invention is disclosed.

In the drawings:

Fig. 6 is an enlarged end elevational view showing the driving mechanism for the roasting and cooling drums.

Fig. 7 is an enlarged rear elevational view of the driving mechanism.

Fig. 8 is a sectional view of the roasting and cooling drums.

Fig. 9 is an enlarged sectional view taken on the line 9—9 of Fig. 8.

Fig. 10 is a sectional view taken on the line 10—10 of Fig. 8.

Fig. 11 is a sectional view of the end portion of the drum taken on the line 11—11 of Fig. 8.

Fig. 12 is a perspective view of one of the members for controlling the admission of the beans into the roasting drum.

Fig. 13 is a perspective view of another part of the mechanism for controlling the admission and exhaust of beans into and from the roasting drum.

Fig. 14 is an enlarged view of the mechanism for controlling the reversal of the machine.

Fig. 15 is a front elevational view of the parts shown in Fig. 14.

Fig. 16 is a sectional plan view taken on the line 16—16 of Fig. 15.

Fig. 17 is an axial sectional view of an end portion of the roasting drum shaft.

Fig. 18 is a fragmentary view of the detent for releasably maintaining the control mechanism in the roasting position.

Fig. 19 is a rear elevation of the parts shown in Fig. 18 and in the direction of the arrow 19.

Fig. 20 is a sectional plan view of the detent assembly for releasably maintaining the control mechanism in a roasting position.

Figure 1:
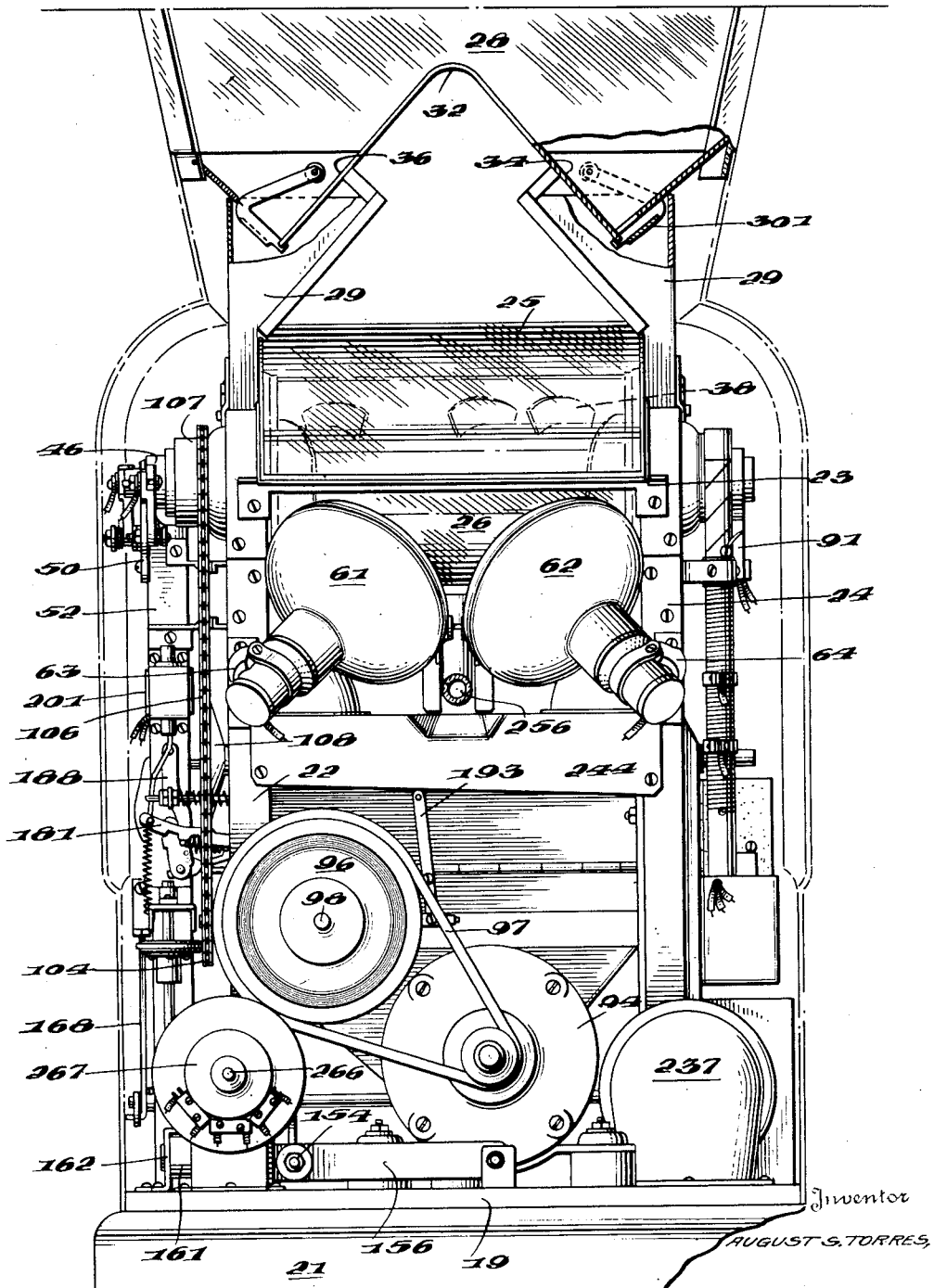
Fig. 1 is a front elevational view of an automatic coffee roasting machine embodying the invention.

The present invention pertains to apparatus for roasting coffee beans in a relatively short period so as to avoid the possibility of prolonged heating of the berries and thereby avoiding the possibility of driving off desirable volatile matter from the coffee beans. The apparatus is accordingly adapted for relatively quick roasting of the beans so that the machine may be used in a retail store to roast green coffee beans within a relatively few minutes so that fresh roasted coffee may be supplied to the customer. One of the advantageous and novel features of the invention pertains to the preheating of the roasting drum prior to the introduction of the coffee beans thereinto and this feature contributes to a shortening of the roasting period and thereby avoids the possibility of prolonged heating of the coffee beans at a low temperature. This object of the invention is attained by first supplying heat to the roasting drum and admitting a batch of green coffee berries to the drum only when a predetermined temperature has been attained within the roasting compartment.

Apparatus exhibiting the invention includes a hopper at the top of the machine having two outlet openings adapted to be opened for permitting the coffee beans to pass into both ends of the roasting drum when the proper predetermined temperature is attained within the drum. The coffee beans are supplied to both ends of the roasting drum and are then moved into the drum by an agitating mechanism, the operation of which is initiated by thermostatic control means which becomes operable when the temperature within the roasting drum is at the proper level.

Another feature of the invention pertains to the heating of the roasting compartment and the heating means includes an electrical heater within the drum which supplies heat along the axis thereof which radiates outwardly and heats the coffee beans during agitation thereof by the agitating mechanism. The heating of the drum is further accomplished by means of infrared rays which are supplied by a plurality of infrared lamps which project rays of wave lengths in excess of 8000 Angstrom units into the roasting drum. Accordingly, the roasting drum is formed of transparent material through which the infrared rays are projected onto the coffee beans. Thus the coffee within the roasting drum is supplied with heat from the electrical heater and the infrared rays penetrate the coffee beans to heat the interior molecular structure of the coffee berries and thereby provide for uniform roasting of the coffee beans without excessively high temperatures. The dual heating arrangement contributes to shortening of the roasting period and tends to provide a more uniform roast for the coffee. The coffee beans roasted in an atmosphere of heat supplied by conduction and convection and a heat supplied by radiation of infrared rays provides coffee of a more uniform size and color and the cracking of the beans is much more uniform.

Another feature of the invention pertains to the interruption of the roasting period when the coffee has attained a predetermined brown color. The interruption of the roasting period is accomplished by means of a photo-electric arrangement which is responsive to the absence of rays reflected from the coffee beans when they acquire the proper dark color. The heating of the coffee beans is immediately interrupted upon the attainment of the desired color so that the beans are not thereafter subjected to any extended or prolonged heating. As the roasting period is terminated, the agitating mechanism is reversed for immediately removing the roasted coffee beans from both ends of the roasting drum and the roasted beans move into a cooling drum. The cooling operation follows immediately upon the termination of the roasting period so that the coffee beans are cooled below a temperature at which any of the volatile material would be removed. The cooling of the coffee beans immediately further enhances the aroma and flavor of the coffee and after the coffee beans have been cooled, they are delivered into a hopper of a dispensing mechanism. During the heating and cooling of the coffee beans, the vapors and gases released during the roasting are removed from the roasting drum by means of a suction arrangement hereinafter described and this venting of the coffee continues during the cooling operation. The entire cycle of operation of the machine including the initiation of the roasting period, the interruption of the roasting of the coffee, the cooling thereof, and the complete cycle of operation is controlled automatically and upon the delivery of the coffee from the cooling drum, the control mechanism returns to a neutral position so that the machine is then in condition for the start of another cycle of roasting and cooling of a further batch of coffee beans.

Referring to the drawings, there is shown at 19 a base for the coffee roasting machine. The roasting and cooling apparatus is arranged and supported above the base 19 and the filtering compartment is arranged under the base 19 and shown generally at 21. The filtering compartment is provided for removing gases and volatile matter during roasting and cooling of the coffee and inasmuch as the filtering arrangement forms no part of the present invention, details of this structure are omitted. The mechanism for roasting and cooling the coffee beans is supported on the base 19 by means of a pair of frame standards 22 and 24 which extend upwardly from the base 19 and terminate adjacent the roasting drum. The roasting drum is shown at 26 in the drawings and is formed of transparent material so that the progress of the roasting of the coffee beans may be observed through the transparent cylinder and for the further purpose of permitting infrared rays emitted by infrared ray lamps to pass through the transparent cylinder and irradiate the coffee beans therein. The upper portion of the drum 26 is covered by a transparent hemi-cylindrical shaped cover 25. The cover 25 is supported by brackets 23 on the frames 22 and 24. The roasting drum 26 is mounted for rotation on and supported by the uprights 22 and 24. A hopper for storing a quantity of green coffee beans is illustrated at 28 in the drawings and is supported by funnel shaped members 29 on the top portion of the standards 22 and 24. The hopper 28 is provided with transparent side walls so that the coffee beans may be observed therethrough and the hopper is so shaped as to dispense coffee from two spaced openings into the funnel shaped members 29 and to thereby deliver the green coffee beans to each end of the roasting drum 26. It is for this purpose that the bottom wall of the hopper 28 is hump shaped as shown at 32 (Figs. 1 and 3) so that coffee beans will move downwardly along the surfaces 34 and 36. The funnel shaped members 29 guide the coffee to positions adjacent the ends of the drum 26.

An agitating mechanism (Fig. 8) is arranged within the roasting drum 26 and formed of a plurality of blades 38. The blades 38 are obliquely mounted so as to move the coffee axially towards the center of the drum when the agitating mechanism is driven in the roasting direction. The blades or vanes 38 are mounted on a plurality of axially extending rods 39 as shown in Figs. 8 and 9. The rods 39 are spaced radially outward from the axis of the drum so as to position the blades or vanes 38 adjacent the transparent wall of the drum. The blades or vanes 38 may be secured to the rods 39 in any suitable manner such as by welding.

Figure 2:
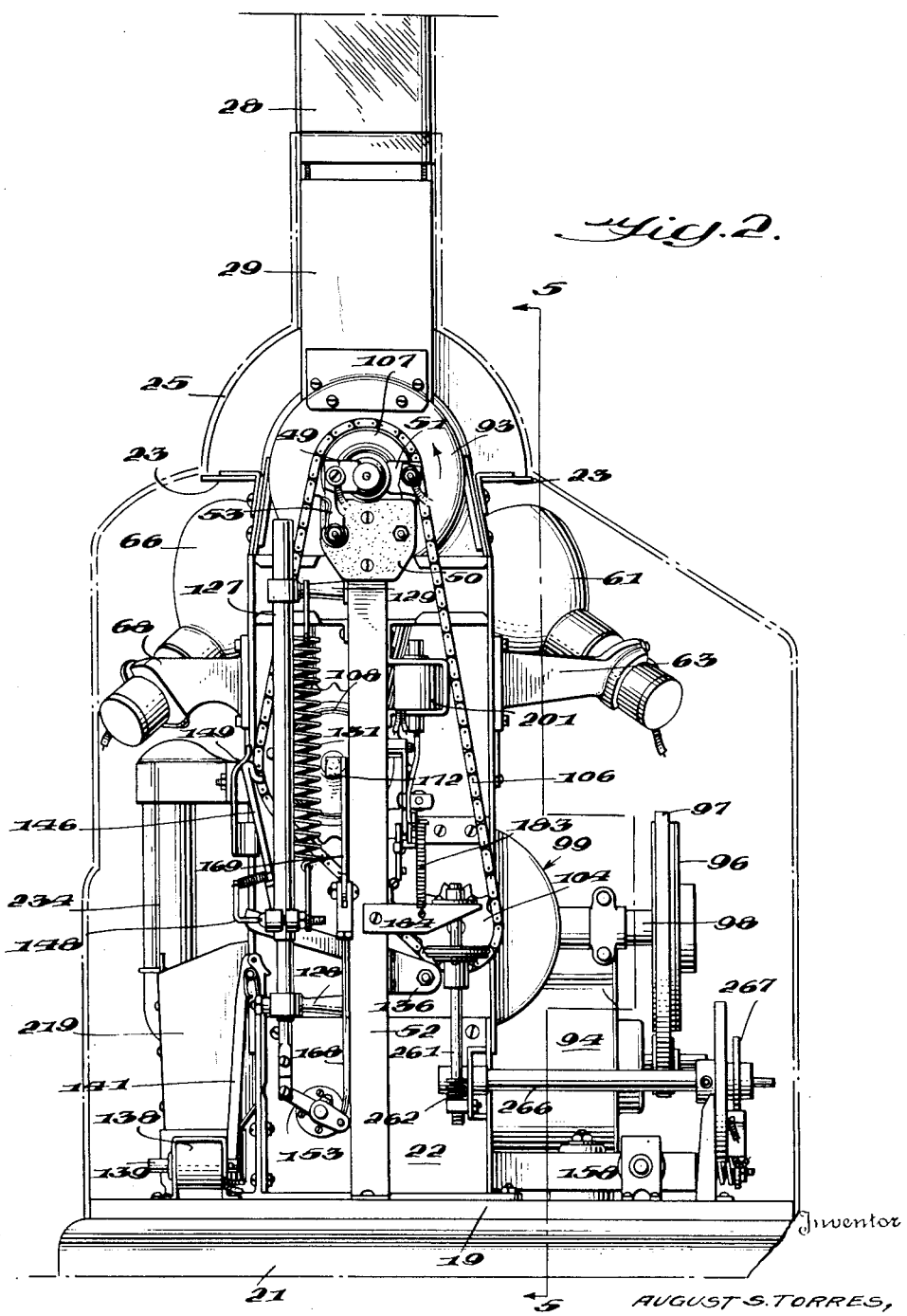
Fig. 2 is an end elevation taken from the left side of Fig. 1.

The roasting drum includes a heating element arranged along the axis thereof and in the embodiment illustrated this heater is in the form of an electric heater 41 (see Fig. 8). The heater 41 may be of a conventional sheathed type so as to prevent oxidation of the heating wire and this heater is mounted in a hollow shaft 42 which supports the drum for rotation. The hollow shaft 42 is journalled in suitable anti-friction bearings 43 which are supported on the frame standards 22 and 24. The heating element 41 is supplied with electrical energy through slip rings 44 and 46. The slip ring 44 is connected by a rod or any suitable conductor 47 to one end of the heater element 41 (Fig. 8). The other end of the electrical heater element is connected to the slip ring 46 through a conductor diagrammatically represented at 48. A brush 49 engages the slip ring 44 and a brush 51 engages the slip ring 46 so that electrical energy may be supplied to the heater element 41 when the agitating and conveyor mechanisms are stationary and during rotation thereof. The brushes 49 and 51 are pivotally mounted on plate-like member 50 formed of suitable insulating material. The plate member 50 is supported by a hollow post 52, as shown in Figs. 2 and 6. The brush holders are resiliently urged towards the slip rings by means of springs 53 and 54. The slip rings 44 and 46 are insulated with respect to each other by a bushing 56 formed of suitable insulating material, as shown in Fig. 8.

The roasting apparatus includes means for preventing the coffee beans from contacting the periphery of the hollow shaft 42 and such means may take the form of a cylindrical wire screen shown at 57 (Fig. 8) and surrounding the shaft 42 in spaced relation therewith as shown particularly in Fig. 8. The annular screen 57 may be secured to the end walls of the drum and to a shoulder portion thereof as shown at 58. The screen 57 may be welded to the offset shoulders 58.

Figure 3:
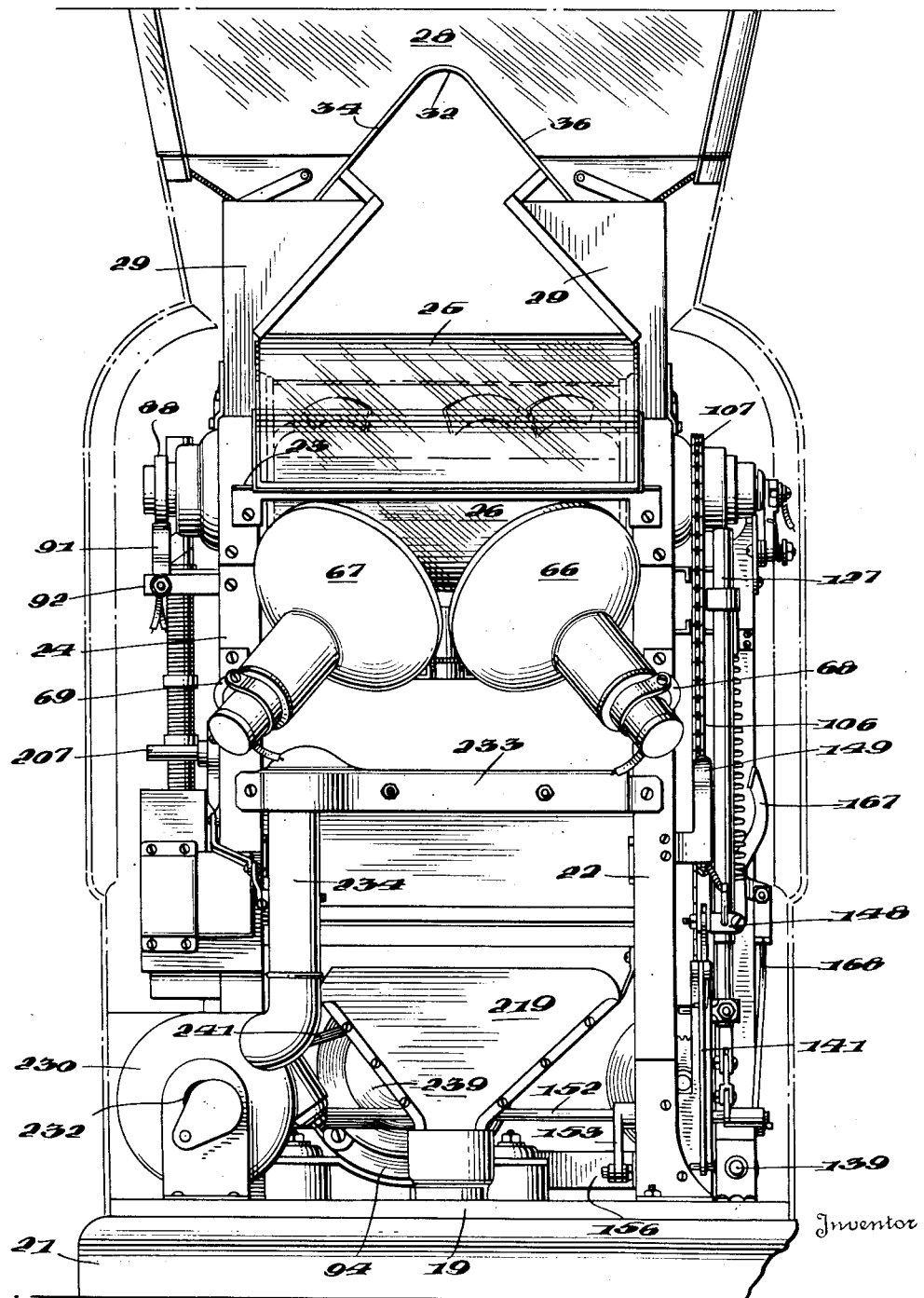
Fig. 3 is a rear elevational view of the coffee roasting machine.

One of the feature of the invention pertains to the preheating of the roasting drum 26 to a temperature sufficient for roasting the coffee beans prior to the admission of the coffee berries into the roasting chamber. This feature of preheating the roasting chamber is for the purpose of avoiding a prolonged heating of the coffee beans at a low temperature in a batch process of coffee roasting. In other words, the roasting compartment is preheated to the required temperature so that there will not be any heating of the coffee at a low temperature to dry out the coffee beans and to otherwise impair the treatment of the coffee before the actual roasting begins. In one embodiment of the invention the interior of the roasting drum 26 is preheated to a temperature of approximately 900° F. prior to the introduction of the coffee beans into the roasting drum. Thus the electrical heater 41 is energized prior to the admission of coffee into the roasting chamber and the invention includes additional heating means. The additional heating means is in the form of infrared rays directed into the roasting chamber. In the embodiment illustrated four sources of infrared rays are employed in the form of infrared ray lamps. Two of the infrared ray lamps are shown at 61 and 62 which are mounted at the front of the machine on brackets 63 and 64. These brackets are attached to the uprights 22 and 24, respectively. The exemplary embodiment includes two infrared ray bulbs 66 and 67 arranged at the back of the machine as shown in Fig. 3. These lamps 66 and 67 are likewise mounted in conventional sockets and supported on the upright standards 22 and 24 by means of brackets 68 and 69. In operation of the machine and prior to the introduction of the coffee beans into the roasting drum, the electrical heater 41 and all four of the infrared ray lamps are energized prior to the introduction of the coffee beans into the roasting chamber and both the electrical heater 41 and the infrared ray lamps thereby preheat the roasting chamber.

Figure 21:
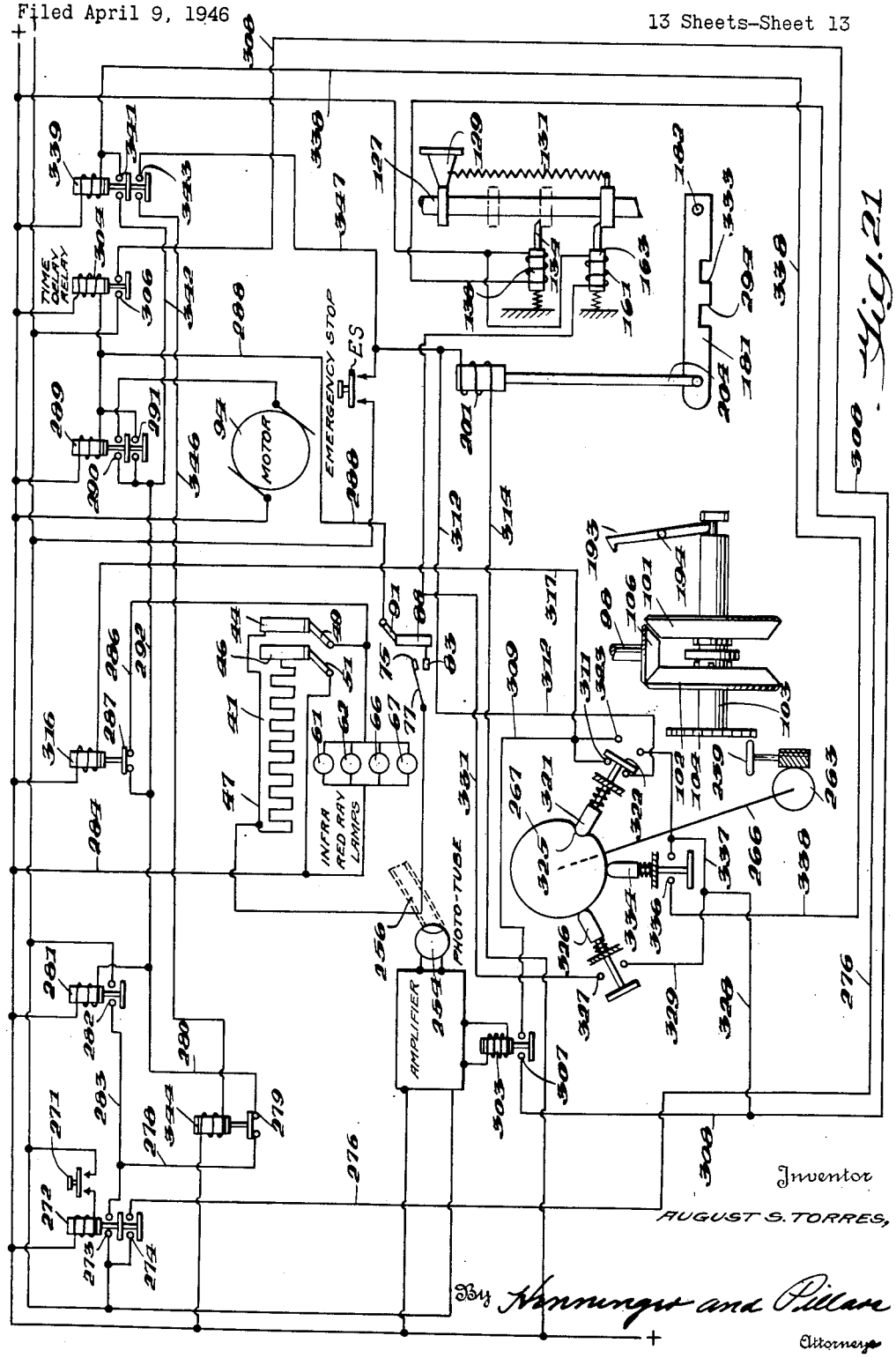
Fig. 21 is a diagram of the control circuit providing automatic operation of the machine.

A feature of the apparatus includes thermostatic control means for moving the green coffee beans into the roasting drum 26 when the proper temperature is attained therein. Such control means includes a thermostat mounted within the roasting drum 26 so as to be responsive to the temperature therein. The thermostat control includes a metal bar 71 (see Figs. 8 and 17) mounted on the exterior of the hollow shaft 42 and within the annular space between the hollow shaft and the annular screen 57. This metal bar 71 is securely anchored at 72 to the shaft 42. The coefficient of expansion of the bar 71 is such that it expands more rapidly upon the application of heat than the shaft 42. The bar 71 carries a pin 73 as shown in Fig. 17 which extends through a relatively large opening 74 in the shaft 42. The pin 73 may be welded or otherwise secured to the bar 71. A relatively rigid arm 76 is mounted on the pin 73 within the hollow shaft 42 and this arm extends to a point adjacent a switch 77. The switch is normally open and is mounted on a support 78 formed of insulating material. The plate-like support 78 is attached to a sleeve 79 by means of a plurality of screws 81. The switch 77 is normally biased to an open position by the inherent resiliency of the blade carrying the movable contact 75. The switch is closed upon expansion of the bar 71 which moves the arm 76 to the right in Fig. 17. A lug 82 formed of suitable insulating material is carried by the arm 76 and is adapted to engage the movable blade of the switch 77 and urge the movable contact thereof into engagement with the fixed contact 83. The lug 82 acts somewhat like a wedge and engages the inner surface of the sleeve 79 in moving to the right in Fig. 17 to cause the closure of the switch contacts. The temperature at which the contacts of the switch 77 are closed may be adjusted by altering the position of the sleeve 79 within the hollow shaft 42. It is for this purpose that a fixed bracket 84 is mounted on an extension 86 of the hollow shaft 42. A threaded screw 87 extends through the bracket 84 into threaded engagement with a lug carried by the sleeve 79. The fixed contact 83 is connected to a slip ring 88 by means of a conductor shown at 89. The slip ring 88 is adapted to rotate with the tubular extension 86 and is insulated therefrom as shown in Fig. 17. A brush 91 engages the slip ring 88 and this brush is mounted on an insulated bracket 92 which is in turn supported on the upright member 24. The movable contact of the switch 77 is connected to the conductor 47 and is thereby adapted to be connected to one side of the electrical supply as illustrated in Fig. 21.

Figure 5:
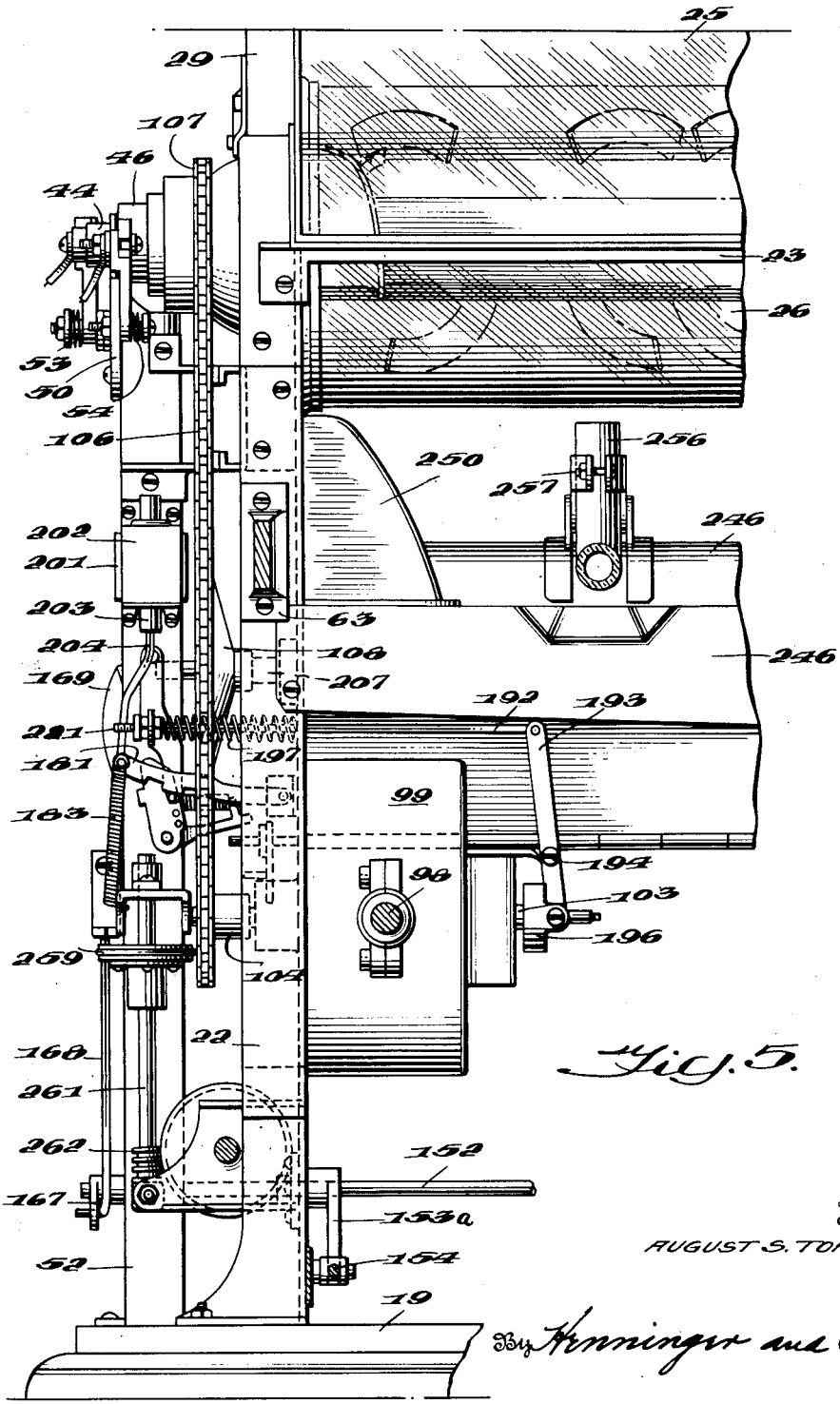
Fig. 5 is an enlarged sectional view of the left end portion of the machine taken on the line 5—5 of Fig. 2.

The closure switch 77 (Fig. 21) initiates the operation of a driving motor for the agitating mechanism. The agitating mechanism and the roasting drum are rotated in the direction of the arrow 93 shown in Figs. 2 and 6 during the roasting period and such rotative movement of the drum may be accomplished in any suitable manner. In the embodiment illustrated an electric motor 94 (Fig. 1) is mounted on the base 19 of the apparatus and current is supplied thereto to drive the motor when the temperature within the roasting drum reaches a predetermined value. The motor 94 drives a pulley 96 by means of a belt 97. The pulley 96 is secured to a shaft 98 which extends into a gear mechanism represented at 99 (Figs. 2 and 5). This gear mechanism includes two bevelled gears 101 and 102 mounted on a shaft 103 as shown in Fig. 21. The bevelled gears 101 and 102 are arranged for free rotation on the shaft 103 but are prevented from axial movement thereon. The shaft 103 extends from the gear casing 99 and a sprocket wheel 104 is secured thereto. The shaft 98 extending into the gear casing from the pulley 96 drives a bevelled pinion 105 as shown in Fig. 21 which meshes with both the bevelled gears 101 and 102.

The means for transmitting rotative movement of the sprocket 104 to the agitating mechanism and roasting drum includes a sprocket chain 106 (Fig. 2) trained about the sprocket wheel 104 and a sprocket wheel 107 secured to the end of the hollow shaft 42 as shown in Fig. 8. The sprocket chain 106 is also trained about a third sprocket wheel 108 for driving the cooling drum as hereinafter described. The sprocket chain 106 moves in the direction of the arrow 93 when the motor 94 is first started at the beginning of a cycle of operation and the agitator mechanism and the roasting drum are accordingly driven in such a direction as to move the coffee beans into the roasting drum from each end thereof.

The coffee beans are admitted to the roasting drum 26 when the motor 94 is started to rotate the roasting drum in the direction of the arrow 93. The end walls 110 and 111 of the roasting drum are provided with a plurality of apertures 112 (Figs. 11-13). These apertures are provided with baffles 113 as shown in Figs. 9 and 10 which are open at the ends 115. The ends of the roasting drum are provided with means for permitting the coffee within the funnel-shaped members 29 to pass into the drum through the openings 112. Such means includes a rotatable gate member 114, one of which is shown in Fig. 12. The gate member surrounds the shaft 42 and the bearing sleeve 116 with sufficient friction as to be rotated with the hollow shaft 42. The gate member 114 accordingly turns with the shaft and the bearing sleeve 116 when the motor first starts to rotate the gate member with the shaft. The gate member carries lugs 117 and 123. The gate member is provided with an open portion 119 which is adapted to register with an opening 121 in a fixed member 122. The fixed member 122 also carries a pin 118. When the lug 118 and the stop member 123 abut during rotation of the gate 114, the open portion 119 of the gate 114 will register with the opening 121. The coffee within the funnel-like members 29 is then free to enter the drum through the openings 112. The agitating mechanism or the vanes 38 are then moving in such a direction as to move the coffee towards the center of the drum from each of the end walls 110 and 111.

The machine upon the termination of a roasting and cooling operation automatically stops in a so-called neutral position and a rod 127 (Figs. 6 and 7) is then in a neutral position. This rod 127 is mounted for guided vertical movement in two brackets 128 and 129. The brackets 128 and 129 are supported by the hollow post 52. A spring 131 urges the rod 127 to an uppermost position. This spring is attached at one end to the bracket 129 and at the lower end thereof to the rod 127 by means of a clamp assembly 132. The rod 127 is accordingly urged toward an uppermost position.

The rod 127 is maintained in a neutral position by a detent 134 which engages a lever arm 135 as shown in Figs. 6 and 18 when the machine is in the neutral position. This lever arm 135 is pivoted at 137 to a bracket 136 carried by the hollow post 52 as shown particularly in Fig. 6. The lever 135 also prevents rotation of the rod 127 about its longitudinal axis. When the lever 135 is in the position shown in Fig. 18, it is engaged under the detent 134 and prevents upward movement of the rod 127. The lever 135 is released electromagnetically by coil 138. This coil 138 includes an armature 139 which is moved to the right in Fig. 2 upon energization of the coil 138. Such movement of the armature 139 swings a lever 141 about its pivot 142. The lever 141 carries a lug 143 which engages the end of the lever 135 as shown in Fig. 18. The supporting strap 144 for the detent 134 is sufficiently resilient by reason of the weakened portion 140 that upon engagement of the lug 143 with the end of the lever 135 the upper end of the strap 144 swings to the left in Fig. 6 and the detent 134 releases the lever 135. The coil 138 is energized upon initiation of operation of the machine so that the rod 127 is free to move upwardly in response to the energy stored in the spring 131. It is to be noted that the motor has not yet been energized and the rotating parts of the machine are accordingly at a standstill. This upward movement of the rod 127 preconditions the machine for the initiation of the roasting operation.

The rod 127 carries an arm 146 which is normally swung to a position toward the left in Fig. 6 by means of a spring 147. The arm 146 is pivoted on the rod 127. The spring 147 is attached to the arm 146 at one end and to a bracket 148 mounted on the movable rod 127. As the rod 127 moves upwardly, the upper end of the arm 146 is swung to the right in Fig. 6 upon the engagement with a fixed cam 149. This cam is mounted on a part of the upright frame member 22 as shown in Figs. 6 and 7. The sprocket wheel 108 carries an axially extending pin 151 which is adapted to engage the upper hook-shaped end of the arm 146 and when the sprocket wheel 108 is moved in a counterclockwise or roasting direction as viewed in Fig. 6. It is to be noted, however, that the sprocket 108 is not yet rotated because the roasting chamber is heated for a period before the motor 94 starts.

The lower end of the rod 127 is connected to a shaft 152 by means of a lever 153 as shown particularly in Fig. 6. The shaft 152 is journalled in a bearing carried by the upright frame 22 and extends lengthwise of the machine as shown in Figs. 3 and 5. The lever arm 153 is secured to the shaft 152 so as to rotate this shaft upon longitudinal movement of the rod 127. A crank arm 153a is attached to the shaft 152 as shown in Figs. 5 and 7. A rod 154 is coupled to the lower end of the arm 153a and this rod extends to a position adjacent the front of the machine. The free end of the rod 154 extends through an opening in a bar 156 as shown particularly in Figs. 1 and 20. A spring 157 is interposed between the bar 156 and the free end of the rod 154. A resilient strap 158 is mounted on the upright frame 22 and this strap extends towards the front of the machine and terminates adjacent the free end of the bar 156. The strap 158 is adapted to form a detent for the bar 156 and is normally biased to a position as shown in Fig. 20 so as to engage the bar 156 and maintain the rod 154 in the position shown in Fig. 20. An electrical coil 161 is mounted on the base of the machine and held in place by a suitable bracket 162. This coil is provided with an armature 163 which is coupled to the strap 158. Thus when the rod 127 is moved downwardly by the pin 151 engaging the arm 146, the rod 154 is moved to the right in Fig. 20 and the coil 161, not then being energized, permits the resilient strap 158 to engage the end 166 of the bar 156 and thereby maintain the rod 127 in the depressed position. The arm 146 in moving downwardly with the rod 127 escapes from the cam 149 and permits the pin 151 to continue in its rotation with the sprocket wheel 108 so that the rod 127 during the roasting operation and during a major portion of the cooling operation remains in its normal position by the detent arrangement shown in Fig. 20.

A lever arm 167 is also secured to the shaft 152 as shown in Fig. 6. This lever arm extends substantially diametrically opposite from the lever arm 153 and a link 168 is pivotally attached to the lever arm 167. This link 168 extends upwardly along the hollow post 52 and is connected at its upper end to a cooling door operating lever 169. This door operating lever 169 is rigidly secured to a shaft 171 which extends through the hollow post 52. The upper end of the door operating lever 169 has an offset portion 172 which is adapted to engage an operating rod for the doors of the cooling drum.

The shaft 171 carries a plurality of levers which are adapted to control the direction of rotation of the driving sprocket 104 (see Figs. 14, 15 and 16). One lever 173 is rigidly secured to the shaft 171 by means of a screw clamp assembly 174. This lever 173 accordingly rotates with the shaft 171. A second lever 176 is mounted for free rotation on the shaft 171. This lever 176 carries a lug 177 which extends laterally therefrom and into the path of movement of the lever 173 as shown in Fig. 14. The lever 173 also carries an integral arm 178 as shown in Fig. 15. A relatively strong spring 179 is attached to an upstanding lug on the arm 178 and this spring is attached at its other end to the lever 176 and is adjustably attached thereto by means of a plurality of openings in the lever 176 as shown in Fig. 15.

A pawl 181 is pivotally mounted at 182 to the frame member 22. The free end of the pawl 181 is urged downwardly by means of a spring 183. This spring is attached at its lower end to a bracket 184. The pawl 181 includes a notch 186 of a generally rectangular shape and spaced from a similarly shaped notch 187.

A lever 188 is pivotally mounted on the hollow post 52 at 189. This lever 188 carries a laterally arranged lug 191 as shown particularly in Figs. 14 and 15. A gear shift operating rod 192 is adjustably attached to the lug 191 and this rod extends through an opening in the frame 22 and is pivotally attached at its other end to a lever 193 (see Fig. 2). The lever 193 is pivoted at 194. The lower end of the lever 193 is attached to the shaft 103 by a suitable coupling 196. This coupling permits rotation of the shaft 103, but the coupling 196 is fixed against longitudinal movement on the shaft 103. The upper end of the lever 193 is biased to the left in Fig. 5 by means of a relatively light spring 197 which is interposed between the frame 22 and the lug 191.

The lower end of the lever 188 carries a pin 198 which normally extends into contact with the lower edge of the pawl 181 between the recesses 186 and 187. The lever 176 also carries a laterally extending pin 199 which is arranged in the path of the movement of the lever 188. An electrical coil 201 is mounted on the hollow post 52 and this coil is maintained in position by means of a suitable bracket 202. An armature 203 is arranged for reciprocation within the coil 201 and the armature is connected by link 204 to the free end of the pawl 181. Energization of the coil 201 will therefore attract the armature 203 and lift the pawl 181 against the action of the spring 183.

The apparatus includes a cooling drum 206 which is mounted on a hollow shaft 207. The shaft 207 is journaled in suitable bearings in the upright frames 22 and 24. The sprocket wheel 108 hereinabove referred to is secured to the hollow shaft 207. The end walls of the cooling drum are provided with apertures 208 and 209 through which the coffee may enter the cooling drum. The frame upright 24 is provided with a housing part 211 to form a closed passage extending downwardly from one end portion of the roasting drum for guiding the coffee into one end of the cooling drum. The other upright frame member 22 is also provided with a housing part 212 to guide the coffee from this end portion of the roasting drum to a position adjacent the other end of the cooling drum.

The cooling drum 206 is provided with a plurality of apertures in the periphery thereof as shown particularly in Fig. 8 and these apertures are for the purpose of permitting air to pass through the cooling drum during the dry quenching operation. The roasted coffee is introduced in the cooling drum through the openings 208 and 209 and during the cooling thereof the drum is rotated by the sprocket wheel 108 which is in turn driven by the sprocket chain 106. The coffee is discharged from the cooling drum through a plurality of hinged doors 214. These doors are more clearly shown in Fig. 9 and are hinged inwardly to the position illustrated in Fig. 9 by means of a spring 216 mounted within the hollow shaft 207. This spring swings a plurality of arms 217 to the angular position shown in Fig. 9 for opening the doors 214. The cooling drum rotates in the direction of the arrow 218 during the cooling operation so that the coffee may be discharged from the cooling drum into a hopper shown at 219. The doors 214 are maintained in a closed position by means of a rod 221 which extends through the hollow shaft 207, and the hub of the sprocket 108 to a position to be engaged by the end 172 of the lever 169. When this rod 221 is moved in opposition to the force of the spring 216, the arms 217 are moved to the position shown in Fig. 8 and the doors 214 are thereby closed.

A plate 226 is mounted below the cooling drum as shown in Fig. 9 and this plate is adapted for guiding the coffee beans discharged from the cooling drum into the hopper 219. This plate is mounted to turn with a shaft 227 and is normally so weighted as to swing to the position shown in Fig. 9. During the roasting and cooling operations, however, this plate should be swung to the dotted line position in Fig. 9 so as to close the outlet aperture below the cooling drum and confine air moving through the ducts hereinafter described from escaping through this discharge aperture. The plate 226 is swung to the closed position by means of a lever arm 231 secured to the end of the shaft 227 and as shown in Fig. 16. This lever arm is turned to a position to close the discharge aperture when the arm 178 is moved to a downward position.

The roasting apparatus includes a fan 230 which is provided with an inlet opening 232. This fan exhausts into a manifold 233 through a pipe 234 as shown in Fig. 3. The manifold 233 extends along the cooling drum and air under pressure is discharged from the manifold 233 through the openings 236 as shown in Fig. 9. The machine includes an exhaust fan 237 as shown particularly in Fig. 4. The fan 230 and the fan 237 are driven by means of a shaft 238 which drives the rotors of the fans. The motor 94 includes a pulley 239 about which a belt 241 is trained and this belt extends around a pulley 242 secured to the shaft 238. The motor 94 accordingly drives the rotors of both fans.

The suction fan 237 exhausts into the filter chamber 21 through a pipe or conduit 243. The suction side of the fan 237 is connected to a duct 244 which extends lengthwise of the cooling drum 206 along the front of the machine. The suction duct 244 is in communication with the housing 246 surrounding the cooling drum. This housing 246 adjacent its ends is provided with openings 247 as shown in Fig. 8. These openings 247 permit communication with the interior of the housings 211 and 212 through the louver openings 248. The louver openings 248 are covered by housing parts 250.

Figure 4:
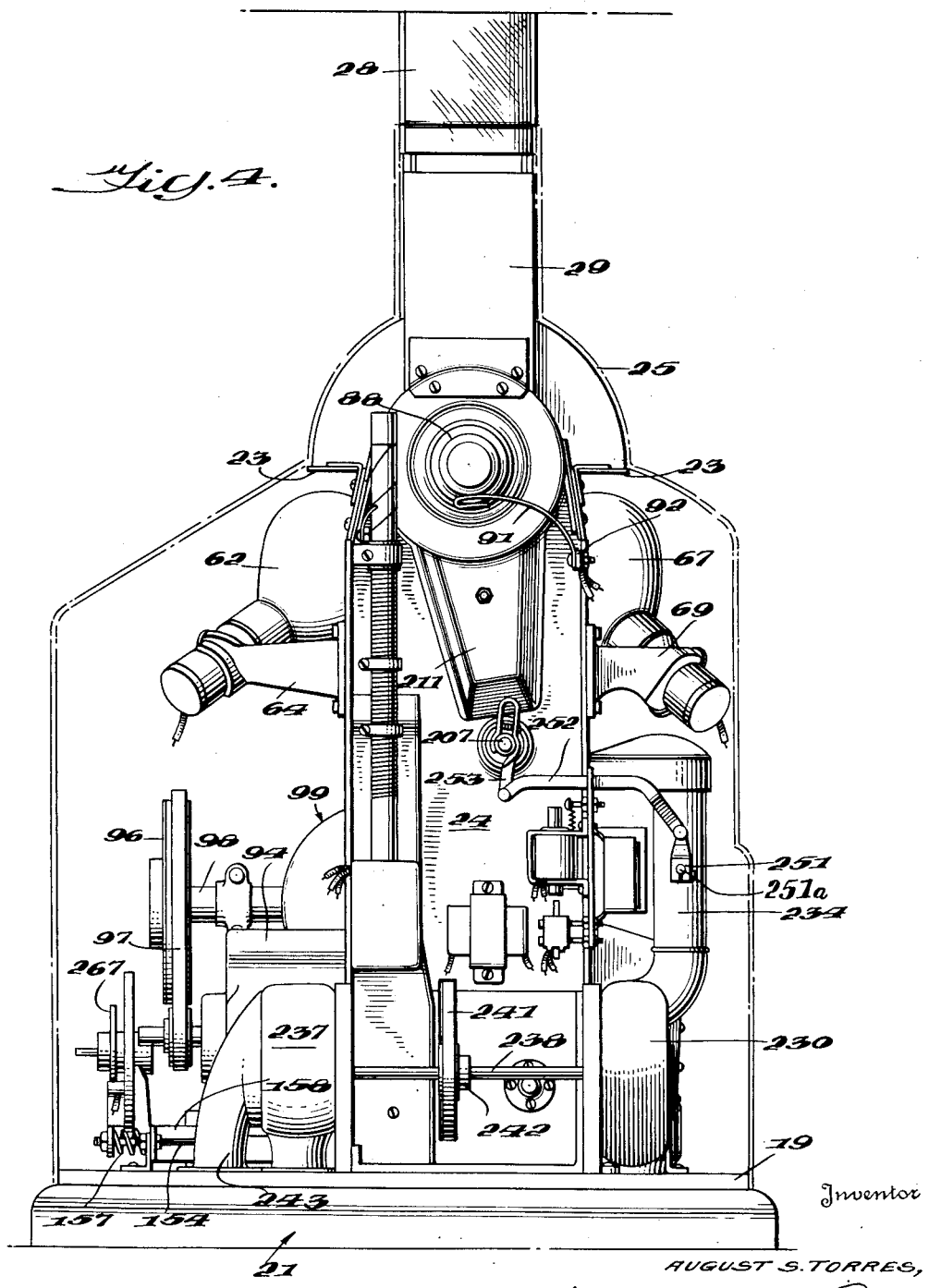
Fig. 4 is an end elevational view taken from the right in Fig. 1.

During the roasting period the pipe 234 is closed so as to avoid blowing air through the manifold 233. The pipe 234 is accordingly provided with a suitable valve of a conventional type which has an operating stem 251a extending to the exterior of the pipe 234 to which is secured an operating lever 251. This lever is connected by a link 252 to a member 253 which frictionally embraces the end of the cooling drum shaft 207 as shown in Fig. 4. Thus when the shaft 207 rotates in one direction during the roasting operation, the frictional clamp 253 turns with the shaft to move the valve operating lever 251 to a position to close the pipe 234. During reversed rotation of the shaft 207 and during the cooling operation, the frictional clamp member 253 rotates therewith so as to move the valve operating lever 251 to a position to open the pipe 234 and to permit air to be forced through the manifold 233 and into and through the cooling drum. This current of air is further assisted in its movement through the cooling drum by the suction created in the duct 244.

The infrared rays emitted by the infrared ray lamps serve to further treat the coffee beans during the roasting period and the infrared rays reflected from the coffee beans are employed for controlling the interruption of the roasting operation. A photo-electric unit 254 (Fig. 21) is employed for receiving the infrared rays reflected from the coffee beans within the roasting drum 26. These reflected rays are conveyed to the photo tube through a solid glass pyrex cane 256 which is coated with any suitable black opaque material. The peripheral surface of the glass rod is polished so as to convey or guide the reflected rays onto the photo tube. The rod 256 may be supported on the housing 246 by means of a bracket and clamp arrangement 257 as shown in Fig. 5.

During reversed rotation of the shaft 103 and during the cooling period the sprocket 104 drives a timing mechanism for controlling the duration of the dry quenching operation. Thus when the shaft 103 is shifted to the left in Fig. 21 to couple the bevelled gear 102 to the shaft 103, this latter shaft is moved to the left and the sprocket wheel 104 engages a friction wheel 259. This friction wheel 259 is mounted on a vertical shaft 261 and carries a worm 262 at the lower end thereof. This worm drives a worm gear 263 mounted on a horizontally arranged shaft 266. This shaft 266 drives a disc 267 which is employed for operating several switches of the electrical systems for controlling the operation of the machine.

Operation

The machine in operation from a previous cycle returns to a neutral position and the rod 127 is retained in an intermediate position by the detent 134. The neutral position of the various control elements is represented in the drawings and in this condition neither of the bevelled gears 101 or 102 is connected to the shaft 103. When it is desired to roast a batch of coffee, the starting button 271 (Fig. 21) is depressed so as to close a circuit through the relay coil 272. This relay immediately picks up and closes the contacts 273 and 274. A circuit is then established through the contacts 274, a conductor 276 through the coil 138 so that this coil is energized and the detent 134 is released from the lever 135 whereby the spring 131 moves the rod 127 to its uppermost position. During this upward movement of the rod 127, the arm 146 engages the cam 149 and moves the upper end of the arm 146 into the path of movement of the pin 151. It is to be noted that the motor 94 has not yet been started and accordingly the sprocket wheel 108 remains stationary and the rod 127 accordingly remains in its uppermost position until the motor starts.

The upward movement of the rod 127 moves the rod 154 to the left in Figs. 6 and 20 since the detent 166 has been released in a previous cycle of operation permitting the rod 127 to move to the neutral position. The upward movement of the rod 127 pulls the link 168 downwardly so as to rotate the shaft 171 in a counter-clockwise direction as viewed in Fig. 15. This movement of the shaft 171 turns the lever 173 therewith and the lever 173 engages the lug 177 and moves the lever 176 also in a counter-clockwise direction. This movement of the lever 176 and the pin 199 permits the spring 197 to swing the lever 188 in a clockwise direction about its pivot 189 in Fig. 15 whereby the pin 198 is moved to the left and lies under the recess 186 in the pawl 181. The spring 183 then swings the pawl 181 downwardly. Such movement of the lever 188 and the rod 192 swings the gear shift lever 193 in a counter-clockwise direction about the pivot 194 in Fig. 5 so as to shift the shaft 103 to the left in Figs. 5 and 21 and thereby couple the gear 101 to the shaft 103.

The closure of the contacts 273 establishes a circuit from the negative side of the line through the conductor 278 and the normally closed contacts 279 and the wire 280 through the relay coil 281 whereby this relay is energized and closes the contacts 282. A holding circuit is provided for the relay 281 even though the starting button 271 is released. This holding circuit extends through the closed contacts 282 and the conductor 283 and the closed contacts 279 whereby the relay 281 remains energized.

When the contacts 282 are closed, the electrical heater 41 is energized and the infrared ray lamps are also placed across the line. This circuit includes the conductor 284 which leads to one end of the electrical resistor 41 through the brush 51 and the slip ring 46. The conductor 284 is also connected to one side of each of the infrared ray lamps. The other side of the infrared ray lamps and the brush 49 of the slip ring 44 are connected to the other side of the line by a circuit which includes a conductor 286 and the normally closed contacts 287 and the conductor 280 and the closed contacts 279, the conductor 278 and the wire 283 and the closed contacts 282. The electrical heater is thereby energized and the infrared ray lamps are lighted so that the roasting chamber or drum 26 is heated. It is to be noted that the coffee beans have not yet been introduced into the roasting drum and the driving motor has not yet been started.

When the roasting drum is heated to a temperature sufficient for initiating the roasting of the coffee, the driving motor is started and the green beans are then introduced into the roasting drum. This desirable function is accomplished by the temperature responsive switch 77 which is closed when the bar 71 expands sufficiently to the right in Fig. 8 to move the switch blade and the contact 75 into engagement with the fixed contact 83. Negative potential is carried by the slip ring 44 and the conductor 47 and accordingly by the switch blade 77 and upon closure of this switch, the circuit extends through the slip ring 88 and the brush 91 and the conductor 288 and the relay coil 289 to the opposite side of the line whereby the contacts 290 and 291 are closed. The closure of the contacts 290 supplies electrical energy to the motor 94 and the motor is accordingly started. The closure of the contacts 291 completes a holding circuit for the relay 289 and this circuit extends through the closed contacts 291 and the conductor 292 and thence to the negative side of the line.

It will be recalled that the bevelled gear 101 is coupled to the shaft 103 so that the sprocket wheel 104 drives the sprocket chain 106 in the direction of the arrow 93 in Fig. 2 when the motor 94 starts. The sprocket wheel 108 is likewise rotated in a counter-clockwise direction in Figs. 2 and 6 so that the pin 151 engages the hook-shaped upper end of the arm 146 and thereby moves the rod 127 to its lowermost position and tensions the spring 131. This downward movement of the rod 127 swings the lever arm 153 in a counter-clockwise direction in Fig. 6 and thereby shifts the rod 154 to the right in Figs. 6 and 20 sufficiently for the resilient strap 158 to engage the bar 156 and thereby retain the rod 127 in its lowermost position since the coil 161 is not then energized.

This downward movement of the rod 127 causes the lever arm 167 to move the link 168 upwardly and thereby swing the door operating lever 169 inwardly towards the door operating rod 221. This movement of the door operating lever 169 also turns the shaft 171 in a clockwise direction as viewed in Fig. 15. The lever 173 is accordingly turned to the right in Fig. 15 so as to move the arm 178 downwardly and to engage the pin 240 carried by the lever arm 231 and thereby rotate the shaft 227 so as to swing the plate 226 to the dotted line position shown in Fig. 9 and thereby close the discharge aperture under the cooling drum. This downward swinging of the arm 178 also tensions the spring 179 since the lever arm 176 is retained in its previous position because the pin 198 is then engaging the shoulder 294 of the pawl 181. Since the pin 198 cannot move to the right, the lever 188 remains in a position to maintain the gear shaft lever 193 in the roasting position (see Fig. 5).

The thermostatic control switch is adjusted by manipulation of the screw 87 so that the temperature within the roasting drum is between 600 and 1,000 degrees F. before the switch 77 is closed. A predetermined quantity of coffee is arranged in the hopper 28 and this coffee is divided by reason of the hump portion 32 so that the coffee is then permitted to move into the funnel-shaped members 29 when the gate members 301 are open. This coffee is then in a position to move adjacent the ends of the roasting drum 26. During the first revolution of the roasting drum, the gate member 114 shown in Fig. 11 is rotated until the lug 117 engages the pin 118. The opening 119 is then in register with the opening 121 in the fixed sleeve member 122 whereby the coffee may move through the openings 112 in the end walls 110 and 111. The baffle members 113 are then moving in a counter-clockwise direction in Fig. 10 so that the coffee may move into the drum 26. The blades or vanes 38 of the agitating mechanism are then moving in such a direction as to urge the coffee axially toward the center of the drum from each end thereof and agitate the coffee during the roasting operation. The coffee beans are immediately subjected to the temperature within the drum derived from the electrical heater 41 and the infrared rays projected from the lamps through the transparent peripheral wall of the roasting drum. The screen 57 prevents the beans from physical contact with the periphery of the shaft 42 and accordingly prevents burning or scorching of the coffee beans.

The initial rotation of the cooling drum in the roasting direction causes the friction clamp member 253 to operate the link 252 in Fig. 4 and close the valve in the pipe 234. Thus the fan 230 does not furnish a positive current of air to the housing 246 even though this fan is started when the motor 94 is energized. The fan 237, however, draws air and vapors from the roasting drum through the suction duct 244 and through the openings 248 in the passages below the roasting drum. Accordingly, the vapors and hot gases released from the coffee beans during roasting are withdrawn through the suction duct 244 and discharged into the filtering assembly arranged below the base of the machine.

The roasting of the coffee continues and one of the features of the invention pertains to means for automatically terminating the roasting operation when the coffee beans have attained a predetermined dark brown color. This function is accomplished by means of a photo-tube control arrangement which is rendered operative within a relatively short period after the motor 94 has been started. The photo-tube control arrangement is designed to operate in accordance with the absence of reflected infrared rays reflected from the coffee beans. Accordingly, the photo-tube control arrangement is not rendered operative until the beans have been arranged within the roasting drum. The photo-tube is shown at 254 in Fig. 21 and includes a filtering lens arrangement wherein all visible light is excluded from impinging upon the photo-tube. The reflected infrared rays are guided to the tube 254 by the glass conducting rod 256. A conventional amplifier arrangement associated with the tube may be energized upon operation of the machine, but the relay 303 is not rendered operative until the contacts of the time delay relay 304 are closed. Any type of time delay relay may be employed and in the embodiment illustrated the coil thereof is energized immediately upon closure of the switch 77, but the relay 304 does not operate to close its contacts 306 until a period of approximately fifteen or twenty seconds have elapsed after closure of the switch 77. The holding circuit through the contacts 291 also maintains the coil of the relay 304 energized even though the switch 77 may again open. The closure of the contacts 306 supplies negative potential to the conductor 308. The relay 303, however, remains deenergized as long as the reflected infrared rays from the coffee beans are above predetermined value. When the coffee beans attain a proper roasted color, the reflected infrared rays fall below a predetermined value and the photo-tube 254 and the amplifier circuit associated therewith operate to energize the relay 303 and the closure of this relay initiates the termination of the roasting period and the reversal of rotation of the roasting drum and the agitating mechanism so as to immediately remove the roasted coffee beans from the roasting drum. When the contacts 307 of the relay 303 are closed, negative potential is then supplied to the conductor 309 and through the normally closed contacts 311 and the conductor 312 and to the coil 201 which is then energized since the other side of the coil 201 is permanently connected to the positive side of the supply through the conductor 314. The pawl 181 is thereby lifted in opposition to the spring 183 whereby the shoulder 294 is moved beyond the path of movement of the pin 198. The lever 176 is then free to move to the right in Fig. 15 in response to the energy stored in the spring 179. This lever 176 is urged in a clockwise direction in Fig. 15 by the spring 179 against the action of the spring 197. Accordingly, the lever 188 is turned in a counter-clockwise direction about its pivot 189. The rod 192 is then moved to the right in Fig. 15 so as to swing the gear shift lever 191 about its pivot 194 and move the shaft 103 to the left in Figs. 5 and 21 and thereby couple the bevelled gear 102 to the shaft 103. This movement of the shaft 103 also moves the sprocket wheel 104 into engagement with the periphery of the friction wheel 259. The bevelled gear 101 is thereby disconnected from the shaft 103 and the sprocket wheel 104 is accordingly rotated in an opposite direction even though the driving motor and the pinion 106 continue to rotate in the initial direction of rotation. The reversal of movement of the sprocket chain 106 accordingly drives the roasting drum 26 and the agitating mechanism in a direction opposite to the arrow 93 in Fig. 6 and the cooling drum is likewise rotated in an opposite direction. Such rotation of the hollow shaft 42 turns the gate members 114 until the lug 123 (Fig. 11) engages the opposite side of the pin 118 whereby the opening 119 thereof is in registration with the passage 120 below the roasting drum. The agitating mechanism is then rotating in a direction whereby the vanes 38 by reason of their oblique arrangement move the coffee towards the end walls and the baffle-shaped scoops 113 pick up the coffee and discharge it from the ends of the drum 26 through the openings 112. The coffee is accordingly removed immediately from the roasting drum so that further residual heating thereof is prevented. The coffee moves downwardly into the cooling drum 206. When the relay 303 is energized, the circuit to the electrical heater 41 and the infrared ray lamps is interrupted and this is accomplished by energization of the relay 316. The circuit for energizing this relay includes the closed contacts 306, the conductor 308, the closed contacts 307, the wire 309, and a conductor 317 which extends to the relay coil 316. The contacts 287 are thereby opened to deenergize the electrical heater 41 and the infrared ray lamps, by breaking the heater and lamp circuit 286.

The initial reversed rotation of the cooling drum shaft 207 swings the link 252 to a position to open the valve in the blower pipe 234 whereby a current of air is forced into the manifold 233 and this air is withdrawn through the suction duct 234 so that the coffee beans are thereby subjected to a dry quenching operation within the drum 206. The plate 226 remains in the dotted line position of Fig. 9 so that all of the air current must pass through a cooling drum 206.

The engagement of the sprocket wheel 104 with the frictional wheel 259 drives the worm gear 263 so as to rotate the disc 267 in a counter-clockwise direction as viewed in Fig. 21. The switch contacts 311 are normally closed when the disc 267 is in the position illustrated in Fig. 21, but when the finger 321 rides on the periphery of the disc 267, the switch blade 322 opens the contacts 311 and closes the contacts 323. The length of the cooling period may be adjusted by altering the speed at which the disc 267 is rotated and in one embodiment of the invention a period of approximately one minute is required for the notch 325 to move from the position illustrated in Fig. 21 to a position radially opposite the finger 326. When this finger drops into the notch 325, the contacts 327 are closed which preconditions the return of the control mechanism to a neutral position. When the contacts 327 are closed, a circuit is established from the negative side of the lines through the closed contacts 306, the conductor 308, a wire 328 and a conductor 329, the closed contacts 327 and the conductor 331 to the coil 161. The opposite side of this coil is connected to the positive side of the line so that the armature 163 is moved into the coil 161 and the resilient strap 158 releases the rod 154 for movement to the left in Fig. 20 so that the rod 127 is free to move upwardly in response to the energy stored in the spring 131. The rod 127, however, is arrested in the neutral position by the detent 134. It will be noted that in this condition of operation the relay coil 272 is no longer energized since the starting button 271 is then in the open position. The machine, however, continues to rotate in the same direction since the downward movement of the link 168 turns the shaft 171 in a counter-clockwise direction, but the pin 198 is then engaged behind the shoulder 333 and the retraction of the lever 176 from engagement with the lower end of the lever 188 does not permit this lever to return to the neutral position. The retraction of the door operating lever 169 is sufficient to permit the doors of the cooling drum to open.

The disc 267 continues to rotate in the counter-clockwise direction and the notch 325 then arrives radially opposite the finger 334. When this finger drops into the notch 325, the contacts 336 are closed. A circuit is then established through the conductor 308, the wire 328, the wire 337, the closed contacts 336 and the conductor 338 and the relay coil 339. This relay is then energized and the contacts thereof are closed. The closed contacts 341 establish a holding circuit for the relay coil 339 through these closed contacts and the wire 342 which is connected to the conductor 292. The closure of the contacts 343 places the entire control circuit in a condition for completing the cycle of operation. The relay coil 344 is placed in parallel with the coil 201 when the contacts 343 are closed. A wire 346 extends from the relay coil 344 to the relay contacts 343 and another conductor 347 extends therefrom to a coil 201.

The coffee is being discharged from the cooling drum since the doors 214 are opened in response to the upward movement of the rod 127 and the cooling drum continues to rotate in the cooling direction until the notch 325 of the disc 267 returns to its original position when the finger 321 again drops into this peripheral notch. The contacts 311 are then closed and negative potential supplied through the conductor 309 is connected to the wire 312 which thereby energizes the coils 201 and the relay coil 344. The pawl 181 is then lifted to permit the pin 198 to escape from the shoulder 333 and return to the neutral position on the lower edge of the pawl 181 between the recesses 186 and 187. The shaft 103 is thereby moved to disconnect the bevelled gear 102 from a coupled relation with this shaft. The energization of the relay 344 opens the normally closed contacts 279 and thereby deenergizes all of the holding circuits for the various relays and at the same time interrupts the motor circuit. The coffee beans then move downwardly into the hopper 219 and the machine is again in condition for initiating another cycle of operation. An emergency stop switch ES (Fig. 21) is provided in the line 347. When the switch ES is normally closed, a circuit is completed to the relay coil 344. When thus energized relay 344 opens the normally closed contacts 279 and thereby deenergizes all of the holding circuits for the various relays and at the same time interrupts the motor circuit. It will thus be seen that manual closure of the stop switch ES is effective to interrupt operation of the roasting machine inasmuch as all of the circuits including the heater circuit are broken.

It will be understood that the invention may be embodied in other forms of apparatus from that herein shown and described. The machine depicted in the drawings and described in the present specification is merely exemplary and the control arrangement is likewise one type that may be employed in connection with the machine for automatically roasting and cooling coffee. Various modifications may be made in the apparatus without departing from the spirit and scope of the invention as set forth in the appended claims.

I claim:

1. In a coffee roasting machine, a coffee roasting drum adapted to substantially retain heat generated therein and being capable of transmitting infrared rays, means for rotatably mounting said drum, an electric heater axially disposed within said drum, a plurality of infrared ray lamps disposed externally of said drum in proximity thereto whereby the rays thereof may be directed against said drum, means for energizing said heater and said lamps, a motor for rotating said drum, and a temperature responsive member in said drum adapted to energize said motor when a predetermined temperature has been attained in said drum.

2. In a coffee roasting machine, a green coffee supply hopper, a roasting drum mounted for rotation below said hopper, a drum charging gate between said drum and said hopper, an electric heater axially disposed within said drum, a source of infrared radiation mounted externally of said drum and in proximity thereto whereby the rays thereof may be projected into said drum, temperature responsive means within said drum, means for energizing said heater and said source of infrared radiation, means under the control of said temperature responsive means for opening said drum charging gate to admit green coffee to said drum when a predetermined temperature has been attained therein, a motor under the control of said temperature responsive means for rotating said drum when coffee has been charged into the same, means independent of said temperature responsive means but responsive to roasting conditions in said drum, and means responsive to said last named means for discharging roasted coffee from said drum.

3. In a coffee roasting machine, a green coffee supply hopper, a roasting drum mounted for rotation below said hopper, a drum charging gate between said drum and said hopper, an electric heater axially disposed within said drum, a plurality of infrared lamps mounted externally of said drum and in proximity thereto whereby the rays thereof may be projected into said drum, a thermostat within said drum, means for energizing said heater and said infrared lamps, a solenoid under the control of said thermostat for opening said drum charging gate to admit green coffee to said drum when a predetermined temperature has been attained therein, a motor under the control of said thermostat for rotating said drum when coffee has been charged into the same, means independent of said temperature responsive means but responsive to roasting conditions in said drum, and means responsive to said last named means for discharging roasted coffee from said drum.

4. In a coffee roasting machine, a green coffee supply hopper, a roasting drum mounted for rotation below said hopper, a drum charging gate between said drum and said hopper, an electric heater axially disposed within said drum, a source of infrared radiation mounted externally of said drum and in proximity thereto whereby the rays thereof may be projected into said drum, temperature responsive means within said drum, means for energizing said heater and said source of infrared radiation, means under the control of said temperature responsive means for opening said drum charging gate to admit green coffee to said drum when a predetermined temperature has been attained therein, a motor under the control of said temperature responsive means for rotating said drum when coffee has been charged into the same, a coffee cooler disposed below said drum, a normally closed gate separating said drum and said cooler, means independent of said temperature responsive means but responsive to roasting conditions in said drum, and means for operating said last named gate in response to said last named means for admitting roasted coffee from said drum to said cooler.

5. In a coffee roasting machine, a green coffee supply hopper, a roasting drum mounted for rotation below said hopper, a drum charging gate between said drum and said hopper, an electric heater axially disposed within said drum, a plurality of infrared lamps mounted externally of said drum and in proximity thereto whereby the rays thereof may be projected into said drum, a thermostat within said drum, means for energizing said heater and said infrared lamps, a solenoid under the control of said thermostat for opening said drum charging gate to admit green coffee to said drum when a predetermined temperature has been attained therein, a motor under the control of said thermostat for rotating said drum when coffee has been charged into the same, a coffee cooler disposed below said drum, a normally closed gate separating said drum and said cooler, means independent of said temperature responsive means but responsive to roasting conditions in said drum, and a solenoid for operating said last named gate in response to said last named means for admitting roasted coffee from said drum to said cooler.

AUGUST S. TORRES.

REFERENCES CITED

The following references are of record in the file of this patent:

UNITED STATES PATENTS

| Number | Name | Date |
|---|---|---|
| 310,026 | Bruning | Dec. 30, 1884 |
| 366,106 | Hungerford | July 5, 1887 |
| 1,086,843 | Nissinen | Feb. 10, 1914 |
| 1,160,650 | Prims | Nov. 16, 1915 |
| 1,176,678 | Heaphy | Mar. 21, 1916 |
| 1,298,130 | Wilcox et al. | Mar. 25, 1919 |
| 1,436,862 | Cretors | Nov. 28, 1922 |
| 1,507,843 | Marshall | Sept. 9, 1924 |
| 1,677,651 | Noonan | July 17, 1928 |
| 1,732,896 | Kirkland | Oct. 22, 1929 |
| 2,010,582 | Burns et al. | Aug. 6, 1935 |
| 2,023,595 | Kemp | Dec. 10, 1935 |
| 2,068,574 | Smith | Jan. 19, 1937 |
| 2,089,663 | Richeson | Aug. 10, 1937 |
| 2,109,597 | Richeson | Mar. 1, 1938 |
| 2,185,878 | Adams et al. | Jan. 2, 1940 |
| 2,278,767 | Brophy | Apr. 7, 1942 |
| 2,287,808 | Lehde | June 30, 1942 |
| 2,294,339 | Hoffman et al. | Aug. 25, 1942 |
| 2,295,920 | Vermillion | Sept. 15, 1942 |
| 2,340,345 | Richeson | Feb. 1, 1944 |
| 2,415,307 | Richeson | Feb. 4, 1947 |